US010983041B2

(12) United States Patent
Yevick et al.

(10) Patent No.: US 10,983,041 B2
(45) Date of Patent: Apr. 20, 2021

(54) FAST FEATURE IDENTIFICATION FOR HOLOGRAPHIC TRACKING AND CHARACTERIZATION OF COLLOIDAL PARTICLES

(71) Applicant: New York University, New York, NY (US)

(72) Inventors: Aaron Yevick, New York, NY (US); Mark Hannel, New York, NY (US); David G. Grier, New York, NY (US); Bhaskar Jyoti Krishnatreya, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 265 days.

(21) Appl. No.: 15/118,785

(22) PCT Filed: Feb. 12, 2015

(86) PCT No.: PCT/US2015/015666
§ 371 (c)(1),
(2) Date: Aug. 12, 2016

(87) PCT Pub. No.: WO2015/175046
PCT Pub. Date: Nov. 19, 2015

(65) Prior Publication Data
US 2017/0059468 A1    Mar. 2, 2017

Related U.S. Application Data

(60) Provisional application No. 61/939,150, filed on Feb. 12, 2014, provisional application No. 62/063,260, filed on Oct. 13, 2014.

(51) Int. Cl.
*G01N 15/14* (2006.01)
*G06N 20/00* (2019.01)
(Continued)

(52) U.S. Cl.
CPC ..... *G01N 15/1429* (2013.01); *G01N 15/1434* (2013.01); *G01N 21/4133* (2013.01);
(Continued)

(58) Field of Classification Search
CPC .................................................. G01N 15/1429
See application file for complete search history.

(56) References Cited

U.S. PATENT DOCUMENTS 3,069,654 A    12/1962 Hough
4,532,422 A    7/1985 Nomura et al.
(Continued)

FOREIGN PATENT DOCUMENTS

CA    1159674 A1    1/1984
EP    0 354 37 A1    9/1981
(Continued)

OTHER PUBLICATIONS

Search Report and Written Opinion for International Application No. PCT/US2015/015666, dated Jan. 7, 2016, 11 pages.
(Continued)

*Primary Examiner* — Manuel A Rivera Vargas
(74) *Attorney, Agent, or Firm* — Foley & Lardner LLP

(57) ABSTRACT

A method and system for identification of holographic tracking and identification of features of an object. A holograph is created from scattering off the object, intensity gradients are established for a plurality of pixels in the holograms, the direction of the intensity gradient is determined and those directions analyzed to identify features of the object and enables tracking of the object. Machine learning devices can be trained to estimate particle properties from holographic information.

17 Claims, 8 Drawing Sheets

(51) Int. Cl.
  *G03H 1/04* (2006.01)
  *G01N 21/41* (2006.01)
  *G03H 1/00* (2006.01)
  *G06F 17/11* (2006.01)

(52) U.S. Cl.
  CPC ......... *G03H 1/0005* (2013.01); *G03H 1/0443* (2013.01); *G06F 17/11* (2013.01); *G06N 20/00* (2019.01); *G01N 2015/1445* (2013.01); *G01N 2015/1493* (2013.01); *G03H 2001/005* (2013.01); *G03H 2001/0033* (2013.01); *G03H 2001/0038* (2013.01); *G03H 2001/0447* (2013.01)

(56) References Cited

U.S. PATENT DOCUMENTS

| | | | |
|---|---|---|---|
| 4,627,729 | A | 12/1986 | Breuckmann et al. |
| 4,740,079 | A | 4/1988 | Koizumi et al. |
| 4,986,659 | A | 1/1991 | Bachalo |
| 4,998,788 | A | 3/1991 | Osakabe et al. |
| 5,095,207 | A | 3/1992 | Tong |
| 5,796,498 | A | 8/1998 | French |
| 5,880,841 | A | 3/1999 | Marron et al. |
| 6,097,488 | A | 8/2000 | Grek et al. |
| 6,214,560 | B1 | 4/2001 | Yguerabide et al. |
| 6,281,994 | B1 | 8/2001 | Horikoshi et al. |
| 6,480,285 | B1 * | 11/2002 | Hill .................. G01B 9/04 356/492 |
| 6,519,033 | B1 | 2/2003 | Quist et al. |
| 6,710,874 | B2 | 3/2004 | Mavliev |
| 7,001,721 | B1 | 2/2006 | Whitcombe et al. |
| 7,218,112 | B2 | 5/2007 | Ladebeck et al. |
| 7,248,282 | B2 | 7/2007 | Maddison |
| 7,338,168 | B2 | 3/2008 | Cartlidge et al. |
| 7,532,327 | B2 | 5/2009 | Bloom et al. |
| 7,839,551 | B2 | 11/2010 | Lee et al. |
| 8,119,988 | B2 | 2/2012 | Daido et al. |
| 8,299,789 | B2 | 10/2012 | Heid et al. |
| 8,331,019 | B2 | 12/2012 | Cheong et al. |
| 8,405,395 | B2 | 3/2013 | Setsompop et al. |
| 8,431,884 | B2 | 4/2013 | Grier |
| 9,316,578 | B2 * | 4/2016 | Grier .................. G01N 15/1475 |
| 9,933,351 | B2 | 4/2018 | Kent et al. |
| 2002/0069242 | A1 | 6/2002 | Berns |
| 2003/0021382 | A1 | 1/2003 | Iwanczyk et al. |
| 2003/0089117 | A1 | 5/2003 | Mao et al. |
| 2004/0004716 | A1 | 1/2004 | Mavliev |
| 2004/0004717 | A1 | 1/2004 | Reed |
| 2004/0072372 | A1 | 4/2004 | Seul et al. |
| 2005/0141757 | A1 | 6/2005 | Ayache et al. |
| 2006/0127369 | A1 | 6/2006 | Christensen et al. |
| 2007/0070303 | A1 | 3/2007 | Yonekubo |
| 2007/0242269 | A1 | 10/2007 | Trainer |
| 2008/0037004 | A1 | 2/2008 | Shamir et al. |
| 2008/0150532 | A1 | 6/2008 | Slavin et al. |
| 2009/0059008 | A1 | 3/2009 | Ishii |
| 2009/0128825 | A1 | 5/2009 | Akcakir |
| 2010/0055031 | A1 | 3/2010 | Ahn |
| 2010/0090694 | A1 | 4/2010 | Heid et al. |
| 2010/0259263 | A1 | 10/2010 | Holland et al. |
| 2011/0043607 | A1 * | 2/2011 | Grier .................. G01N 15/0227 348/40 |
| 2011/0130348 | A1 | 6/2011 | Ting et al. |
| 2011/0157599 | A1 | 6/2011 | Weaver et al. |
| 2011/0292363 | A1 | 12/2011 | Ivey et al. |
| 2012/0135535 | A1 * | 5/2012 | Grier .................. G01N 15/1475 436/164 |
| 2012/0177543 | A1 | 7/2012 | Battrell et al. |
| 2012/0235678 | A1 | 9/2012 | Seiberlich et al. |
| 2012/0256626 | A1 | 10/2012 | Adalsteinsson et al. |
| 2012/0273664 | A1 | 11/2012 | Grier et al. |
| 2013/0038326 | A1 | 2/2013 | Amadon et al. |
| 2013/0271135 | A1 | 10/2013 | Ozen et al. |
| 2013/0278743 | A1 | 10/2013 | Cheong et al. |
| 2013/0308135 | A1 | 11/2013 | Dubois et al. |
| 2014/0313510 | A1 | 10/2014 | Schmidt et al. |
| 2015/0062587 | A1 | 3/2015 | Shpaisman |

FOREIGN PATENT DOCUMENTS

| | | | |
|---|---|---|---|
| EP | 0 278 714 | A2 | 8/1988 |
| EP | 1 855 081 | A1 | 11/2007 |
| EP | 1 865 430 | A2 | 12/2007 |
| JP | 55-096976 | A | 7/1980 |
| JP | 03-251388 | A | 11/1991 |
| JP | 03-251888 | A | 11/1991 |
| JP | 2000-225302 | A | 8/2000 |
| JP | 2001-034148 | A | 2/2001 |
| JP | 2007-279475 | A | 10/2007 |
| JP | 2011-502256 | A | 1/2011 |
| JP | 2011-525967 | A | 9/2011 |
| JP | 2014-503794 | A | 2/2014 |
| WO | WO-03/048868 | A1 | 6/2003 |
| WO | WO-2005/027031 | A2 | 3/2005 |
| WO | WO-2006/034129 | A2 | 3/2006 |
| WO | WO-2008/127410 | A2 | 10/2008 |
| WO | WO-2008/142560 | A2 | 11/2008 |
| WO | WO-2009/059008 | A1 | 5/2009 |
| WO | WO-2012/061752 | | 5/2012 |
| WO | WO-2013/080164 | A1 | 6/2013 |
| WO | WO-2013/126554 | A1 | 8/2013 |

OTHER PUBLICATIONS

Atherton, T.J., et al., "Size invariant circle detection", Image and Vision Computing, 1999, 17(11): 795-803.

Ballard, D.H., "Generalizing the Hough Transform to Detect Arbitrary Shapes", Pattern Recognition, 1981, 13(2):111-122.

Basim, G.B., et al., "Effect of Particle Size of Chemical Mechanical Polishing Slurries for Enhanced Polishing with Minimal Defects", Journal of the Electrochemical Society, 2000, 147(9):3523-3528.

Bishop, C.M., Neural Networks for Pattern Recognition, Dec. 31, 2015, p. 207, Oxford University Press, New York.

Boas, D.A.,et al., "Scattering of diffuse photon density waves by spherical inhomogeneities within turbid media: analytic solution and applications", Proc. Natl. Acad. Sci. USA, May 1994, 91(11):48874891.

Bolognesi, G., et al., "Digital holographic tracking of microprobes for multipoint viscosity measurements", Optics Express, Sep. 26, 2011, 19(20):19245-19254.

Bourquard, A., et al., "A practical inverse-problem approach to digital holographic reconstruction", Optics Express, Feb. 11, 2013, 21(3):3417-3433.

Chang, C-C., et al., "LIBSVM: A Library for Support Vector Machines", ACM Transactions on Intelligent Systems and Technology, 2011, 2(3), 39 pages.

Chang, C-C., et al., "Training v-Support Vector Regression: Theory and Algorithms", Neural Computation, 2002, 14(8):1959-1977.

Cheong, F.C., et al., "Flow visualization and flow cytometry with holographic video microscopy", Optics Express, Jul. 20, 2009, 17(15):13071-13079.

Cheong, F.C., et al., "Holographic characterization of individual colloidal spheres' porosities", Soft Matter, 2011, 7(15):6816-6819.

Cheong, F.C., et al., "Holographic microrheology of polysaccharides from Streptococcus mutans biofilms", Rheologica Acta, 2009, 48(1):109-115.

Cheong, F.C., et al., "Strategies for three-dimensional particle tracking with holographic video microscopy", Optics Express, 2010, 18(13):13563-13573.

Cheong, F.C., et al., "Technical note: Characterizing individual milk fat globules with holographic video microscopy", Journal of Dairy Science, 2009, 92(1):95-99.

Chia, V.K.F., et al., "A Review of Analytical Techniques for Identifying Contaminants in the Semiconductor Industry", Journal of the IEST, 2002, 45(1):37-44.

Crocker, J.C., et al., "Methods of Digital Video Microscopy for Colloidal Studies", Journal of Colloid and Interface Science, 1996, 179(1):298-310.

(56) References Cited

OTHER PUBLICATIONS

Dixon, L., et al., "Holographic particle-streak velocimetry", Optics Express, Feb. 28, 2011, 19(5): 4393-4398.
Dumm, T.F., "Characterization of Low-Level, Oversize Particles in Abrasive Powders", KONA Powder and Particle Journal, 2005, 23:129-138.
Fung, J., et al., "Holographic measurements of anisotropic three-dimensional diffusion of colloidal clusters", Physical Review E, 2013, 88:020302-1-5.
Fung, J., et al., "Measuring translational, rotational, and vibrational dynamics in colloids with digital holographic microscopy", Optics Express, Apr. 25, 2011, 19(9):8051-8065.
Goodman, J.W., "Statistical Properties of Laser Speckle Patterns", Laser Speckle and Related Phenomena, 2007, pp. 9-75.
Grier, D.G., "A Revolution in Optical Manipulation", Nature, 2003, 424:810-816.
Hogg, R., "Issues in Particle Size Analysis", KONA Powder and Particle Journal, 2008, 26:81-93.
Hollitt, C., "A convolution approach to the circle Hough transform for arbitrary radius", Machine Vision and Applications, 2013, 24(4):683-694.
Hukkanen E.J., et al., "Measurement of particle size distribution in suspension polymerization using in situ laser backscattering", Sensors and Actuators B: Chemical, 2003, 96(1-2):451-459.
Ishimaru, A., "Diffusion of light in turbid material", Applied Optics, Jun. 15, 1989, 28(12):2210-2215.
Krishnatreya, B.J., et al., "Fast feature identification for holographic tracking: the orientation alignment transform", Optics Express, Jun. 2, 2014, 22(11):12773-12778.
Krishnatreya, B.J., et al., "Measuring Boltzmann's constant through holographic video microscopy of a single colloidal sphere", American Journal of Physics, 2014, 82(1):23-31.
Lee, S-H., et al., "Holographic microscopy of holographically trapped three-dimensional structures", Optics Express, Feb. 19, 2007, 15(4):1505-1512.
Lee, S-H., et al., "Characterizing and tracking single colloidal particles with video holographic microscopy", Optics Express, Dec. 24, 2007, 15(26):18275-18282.
Lee, M.H., et al., "Statistics of speckle propagation through the turbulent atmosphere", J. Opt. Soc. Am., Nov. 1976, 66(11):1164-1172.
Maret, G., et al., "Multiple Light Scattering from Disordered Media. The Effect of Brownian Motion of Scatterers", Z. Phys. B—Condensed Matter, 1987, 65(4):409-413.
Parthasarathy, R., "Rapid, accurate particle tracking by calculation of radial symmetry centers", Nature Methods, 2012, 9:724-726.
Pedregosa, F., et al., "Scikit-learn: Machine Learning in Python", Journal of Machine Learning Research, 2011, 12:2825-2830.
Pine, D.J., et al., "Diffusing-Wave Spectroscopy", Physical Review Letters, Mar. 21, 1988, 60(12): 1134-1137.
Remsen, E.E., et al., "Analysis of Large Particle Count in Fumed Silica Slurries and Its Correlation with Scratch Defects Generated by CMP", Journal of the Electrochemical Society, 2006 153(5):G453-G461.
Roichman, Y., et al., "Influence of non-conservative optical forces on the dynamics of optically trapped colloidal spheres: the fountain of probability", Physical Review Letters, 2008, 101:128301, 5 pages.
Rubinstein, J., et al., "Recognition of Distorted Patterns by Invariance Kernels", Pattern Recognition, 1991, 24(10):959-967.
Savin, T., et al., "Role of a finite exposure time on measuring an elastic modulus using microrheology", Physical Review E, 2005, 71:041106-1-6.
Savin, T., et al., "Static and Dynamic Errors in Particle Tracking Microrheology", Biophysical Journal, Jan. 2005, 88(1):623-638.
Seifi, M., et al., "Fast and accurate 3D object recognition directly from digital holograms", J. Opt. Soc. Am. A, Nov. 2013, 30(11):2216-2224.
Sheng, J., et al., "Digital holographic microscope for measuring three-dimensional particle distributions and motions", Applied Optics, Jun. 1, 2006, 45(16):3893-3901.
Shpaisman, H., et al., "Holographic microrefractometer", Applied Physics Letters, 2012, 101:091102, 3 pages.
Smola, A.J., et al., "A tutorial on support vector regression", Statistics and Computing, 2004, 14(3): 199-222.
Tolla, B., "Distortion of Single-Particle Optical Sensing (Spos) Particle Count by Sub-Countable Particles", Part. Part. Syst. Charact., 2010, 27(1-2):21-31.
Xiao, K., et al., "Multidimensional optical fractionation with holographic verification", Physical Review Letters, 2010, 104:028302, 4 pages.
Yang, C., et al., "Spatial coherence of forward-scattered light in a turbid medium", J. Opt. Soc. Am. A, Apr. 1999, 16(4):866-871.
International Search Report and Written Opinion in PCT/US2016/051946, dated Nov. 24, 2016, 7 pages.
Extended European Search Report in EP 15792186.7, dated Dec. 14, 2017, 11 pages.
Non-Final Office Action in U.S. Appl. No. 15/518,739, dated May 3, 2018, 5 pages.
Written Opinion in SG 11201802181R, dated Mar. 28, 2019, 7 pages.
Final Office Action for U.S. Appl. No. 15/759,502, dated Apr. 19, 2019, 7 pages.
Office Action in EP 15792186.7, dated Apr. 26, 2019, 6 pages.
Aspnes, D.E., "Local-field effects and effective-medium theory: a microscopic perspective", Am. J. Phys., Aug. 1982, 50(8):704-709.
Ball, V., et al., "Complexation Mechanism of Bovine Serum Albumin and Poly(allylamine hydrochloride)", J. Phys. Chem. B, 2002, 106(9):2357-2364.
Basim, G.B., et al., "Effect of Soft Agglomerates on Cmp Slurry Performance," Journal of Colloid and Interface Science, 2002, 256(1):137-142.
Ben-Eliezer, N., et al., "A New Model-Based Technique for Accurate Reconstruction of T2 Relaxation Maps from Fast Spin-Echo Data", Proc. Intl. Soc. Mag. Reson. Med., 2013, 21:2453.
Carpenter, J.F., et al., "Overlooking Subvisible Particles in Therapeutic Protein Products: Gaps That May Compromise Product Quality", Journal of Pharmaceutical Sciences, Apr. 2009, 98(4):12011205.
Cheong, F.C., et al., "Rotational and translational diffusion of copper oxide nanorods measured with holographic video microscopy", Optics Express, 29 Mar. 2010, 18(7):6555-6562.
Colomb, T., et al., "Polarization microscopy by use of digital holography: application to optical-fiber birefringence measurements," Applied Optics, 2005, 44(21):4461-4469.
Costantino, H.R., et al., "Moisture-Induced Aggregation of Lyophilized Insulin", Pharmaceutical Research, 1994, 11(1):21-29.
Demeule, B., et al., "Characterization of Particles in Protein Solutions: Reaching the Limits of Current Technologies", The AAPS Journal, Dec. 2010, 12(4):708-715.
Den Engelsman, J., et al., "Strategies for the Assessment of Protein Aggregates in Pharmaceutical Biotech Product Development", Pharm Res, 2011, 28(4):920-933.
Denis, et al., "Direct Extraction of the Mean Particle Size from a Digital Hologram," Applied Optics, 2006, 45(5):944-952.
Doneva, M., et al., "Compressed Sensing Reconstruction for Magnetic Resonance Parameter Mapping", Magnetic Resonance in Medicine, 2010, 64:1114-1120.
Egorov, "Systematika, printsipy raboty i oblasty primeneniya datchikov (Systematics, the principle of operation and sensor applications)", Zhurnal radioelectroniki (Journal of Radio Electronics), 2009, vol. 3, 22 pages (English abstract).
Feder, J., et al,. "Scaling Behavior and Cluster Fractal Dimension Determined by Light Scattering from Aggregating Proteins", Physical Review Letters, Oct. 8, 1984, 53(15):1403-1406.
Filipe, V., et al., "Critical Evaluation of Nanoparticle Tracking Analysis (NTA) by NanoSight for the Measurement of Nanoparticles and Protein Aggregates", Pharmaceutical Research, May 2010, 27(5):796-810.

(56) References Cited

OTHER PUBLICATIONS

Fung, J., et al., "Imaging Multiple Colloidal Particles by Fitting Electromagnetic Scattering Solutions to Digital Holograms", Journal of Quantitative Spectroscopy and Radiative Transfer, 2012, 113(18):24822489.
Goller, M.I., et al., "Inorganic "silicone oil" microgels", Colloids and Surfaces A: Physicochemical and Engineering Aspects, 1997, 123-124:183-193.
Graesslin, I., et al., "Fully Integrated Whole Body 3T MRI System for Parallel RF Transmission", Proc. Intl. Soc. Mag. Reson. Med., 2007, 15:1007.
Graesslin, I., et al., "Whole Body 3T MRI System with Eight Parallel RF Transmission Channels", Proc. Intl. Soc. Mag. Reson. Med., 2006, 14:129.
Hagiwara, T., et al., "Fractal Analysis of Aggregates Formed by Heating Dilute Bsa Solutions Using Light Scattering Methods", Biosci. Biotech. Biochem., 1996, 60(11):1757-1763.
Haist, T., et al., "Using Graphics Boards to Compute Holograms", Computing in Science & Engineering, Jan./Feb. 2006, 8:8-13.
Hillman, T.R., et al., "Microscopic particle discrimination using spatially-resolved Fourier-holographic light scattering angular spectroscopy", Optics Express, Nov. 13, 2006, 14(23):11088-11102.
Holm, N.K., et al., "Aggregation and fibrillation of bovine serum albumin," Biochimica et Biophysica Acta (BBA)—Proteins and Proteomics, 2007, 1774(9):1128-1138.
Jones, L.S., et al., "Silicone Oil Induced Aggregation of Proteins", Journal of Pharmaceutical Sciences, Apr. 2005, 94(4):918-927.
Kao, H.P., et al., "Tracking of Single Fluorescent Particles in Three Dimensions: Use of Cylindrical Optics to Encode Particle Position", Biophysical Journal, Sep. 1994, 67(3):1291-1300.
Katscher, U., et al., "Parallel RF transmission in MRI", NMR Biomed., 2006,19(3):393-400.
Katscher, U., et al., "RF Encoding Using a Multielement Parallel Transmit System", Magnetic Resonance in Medicine, 2010, 63(6):1463-1470.
Kolomenkin, M., et al., "Geometric Voting Algorithm for Star Trackers", IEEE Transactions on Aerospace and Electronic Systems, Apr. 2008, 44(2):441-456.
Kosters, T., et al., "Emrecon: An Expectation Maximization Based Image Reconstruction Framework for Emission Tomography Data", 2011, IEEE Nuclear Science Symposium Conference Record, pp. 4365-4368.
Ma, D., et al., "Magnetic resonance fingerprinting", Nature, Mar. 14, 2013, 495:187-193.
Malitson, I.H., "Interspecimen Comparison of the Refractive Index of Fused Silica", Journal of the Optical Society of America, 1965, 55(10):1205-1209.
Maschke, a., et al., "Micronization of Insulin by High Pressure Homogenization", Pharmaceutical Research, Sep. 2006, 23(9):2220-2229.
Meakin, P., "Fractal Aggregates", Advances in Colloid and Interface Science, 1988, 28:249-331.
Moreno, D., et al., "Particle positioning from charge-coupled device images by the generalized Lorenz-Mie theory and comparison with experiment", Applied Optics, Oct. 1, 2000, 39(28):51175124.
Moyses, et al., "Robustness of Lorenz-Mie microscopy against defects in illumination," Optics Express 21(5), pp. 5968-5973 (2013).
Mueller, S.G., et al., "The Alzheimer's Disease Neuroimaging Initiative", Neuroimaging Clin N Am., Nov. 2005, 15(4):869-877.
Nebrensky, JJ, et al., "A Particle Imaging and Analysis System for Underwater Holograms", Optical Methods and Data Processing in Heat and Fluid Flow, 2002, pp. 79-92.
Nelles, M., et al., "Dual-Source Parallel RF Transmission for Clinical MR Imaging of the Spine at 3.0 T: Intraindividual Comparison with Conventional Single-Source Transmission", Radiology, Dec. 2010, 257(3):743-753.
Obey, T.M., et al., "Novel Monodisperse "Silicone Oil"/Water Emulsions", Journal of Colloid and Interface Science, 1994, 163(2):454-463.

Orzada, S., et al., "Design and comparison of two eight-channel transmit/receive radiofrequency arrays for in vivo rodent imaging on a 7 T human whole-body MRI system", Med. Phys., May 2010, 37(5):2225-2232.
Pan, X-H, et al., "Three-dimensional particle image tracking for dilute particle-liquid flows in a pipe", Meas. Sci. Technol., 2002, 13(8):1206-1216.
Pawashe, C., et al., "Two-dimensional vision-based autonomous microparticle manipulation using a nanoprobe", Journal of Micromechatronics, 2006, 3(3-4):285-306.
Perry, et al., "Real-space studies of the structure and dynamics of self-assembled colloidal clusters," Faraday Discussions 159, pp. 211-234 (2012).
Quick, "Integrated PET/MR," Journal of Magnetic Resonance Imaging 39(2), pp. 243-258 (2014).
Rappaz, et al., "Erythrocytes volume and refractive index measurement with a digital holographic microscope," Proceedings vol. 6445: Optical Diagnostics and Sensing VII, 644509, 5 pages (2007).
Rappaz, et al., "Simultaneous cell morphometry and refractive index measurement with dual-wavelength digital holographic microscopy and dye-enhanced dispersion of perfusion medium," Optics Letters 33(7), pp. 744-746 (2008).
Ripple, D.C., et al., "Protein Particles: What We Know and What We Do Not Know", Journal of Pharmaceutical Sciences, 2012, 101(10):3568-3579.
Schellekens, "Bioequivalence and the immunogenicity of biopharmaceuticals," Nature Reviews Drug Discovery 1, pp. 457-462 (2002).
Sciammarella, C.A., et al., "Measuring Mechanical Properties of Materials in the Micron Range", Optical Engineering, May 2003, 42(5), 8 pages.
Siler, D.J., et al., "Measurement of Protein in Natural Rubber Latex", Analytical Biochemistry, 1995, 229(2):278-281.
Singh, et al., "An industry perspective on the monitoring of subvisible particles as a quality attribute for protein therapeutics," Journal of Pharmaceutical Sciences 99(8), pp. 3302-3321 (2010).
Siposova, et al., "Depolymerization of insulin amyloid fibrils by albumin-modified magnetic fluid," Nanotechnology 23(5), 055101, 10 pp.(2012).
Sluzky, et al., "Kinetics of insulin aggregation in aqueous solutions upon agitation in the presence of hydrophobic surfaces," Proceedings of the National Academy of Sciences 88(21), pp. 9377-9381 (1991).
Sorensen, "Light Scattering by Fractal Aggregates: A Review," Aerosol Science and Technology 35(2), pp. 648-687 (2001).
Strzodka, et al., "Real-Time Motion Estimation and Visualization on Graphics Cards," IEEE Visualization 2004, pp. 545-552 (2004).
Voros, J., "The Density and Refractive Index of Adsorbing Protein Layers", Biophysical Journal, Jul. 2004, 87(1):553-561.
Wang, "Protein aggregation and its inhibition in biopharmaceutics," International Journal of Pharmaceutics 289(1-2), pp. 1-30 (2005).
Weber, E., et al., "A Novel 8-Channel Transceive Volume-Array for a 9.4T Animal Scanner", Proc. Intl. Soc. Mag. Reson. Med., 2008, 16:151.
Weinbuch, et al., "Micro—Flow Imaging and Resonant Mass Measurement (Archimedes) —Complementary Methods to Quantitatively Differentiate Protein Particles and Silicone Oil Droplets," Journal of Pharmaceutical Sciences 102(7), pp. 2152-2165 (2013).
Witten Jr., T.A., et al., "Diffusion-Limited Aggregation, a Kinetic Critical Phenomenon," Physical Review Letters, Nov. 9, 1981, 47(19):1400-1403.
Wu, S-H., et al., "Synthesis of mesoporous silica nanoparticles", Chem. Soc. Rev., 7 May 2013, 42(9):3862-3875.
Yip, C.M., et al., "Atomic Force Microscopy of Crystalline Insulins: the Influence of Sequence Variation on Crystallization and Interfacial Structure", Biophysical Journal, May 1998, 74(5):2199-2209.
Yip, C.M., et al., "Structural and Morphological Characterization of Ultralente Insulin Crystals by Atomic Force Microscopy: Evidence of Hydrophobically Driven Assembly", Biophysical Journal, Sep. 1998, 75(3):1172-1179.
Zolls, S., et al., "How Subvisible Particles Become Invisible—Relevance of the Refractive Index for Protein Particle Analysis", Journal of Pharmaceutical Sciences, May 2013, 102(5):1434-1446.

(56) References Cited

OTHER PUBLICATIONS

Written Opinion of the International Searching Authority for PCT/US2008/081794 dated Feb. 12, 2009, 5 pages.
International Search Report & Written Opinion for PCT/US2010/021045, dated Apr. 30, 2010, 6 pages.
Extended European Search Report for European Patent App. No. 08844591.1, dated Nov. 5, 2011, 7 pages.
Examination Report for European Patent App. No. 08844591.1, dated Jan. 23, 2012, 6 pages.
Notice of Reasons for Refusal for Japanese Patent App. No. 2010-531335 dated Oct. 18, 2012, 6 pages (with translation).
Notice of Reasons for Refusal for Japanese Patent App. No. 2011-546331 dated Oct. 25, 2012, 6 pages (with translation).
International Search Report and Written Opinion in PCT/US2012/051542, dated Nov. 22, 2012, 6 pages.
First Office Action for Chinese Patent App. No. 201080009712.X, dated Dec. 18, 2012, 15 pages (with translation).
Office Action for Chinese Patent App. No. 200880114008.3 dated Jul. 18, 2013, 25 pages (with translation).
Fifth Office Action for Chinese Patent App. No. 201080009712.X, dated Mar. 11, 2015, 17 pages (with translation).
Extended European Search Report for European Patent App. No. 15152531.8, dated Mar. 20, 2015, 4 pages.
International Search Report and Written Opinion for PCT/US2015/037472, dated Sep. 23, 2015, 9 pages.
International Search Report and Written Opinion for PCT/US2015/055154, dated Jan. 7, 2016, 11 pages.
International Search Report and Written Opinion for PCT/US2015/060183, dated Feb. 2, 2016, 9 pages.
Office Action for Chinese Patent App. No. 201410471610.X dated Mar. 22, 2016, 21 pages (with translation).
Extended European Search Report for European Patent App. No. 16169799.0, dated Aug. 18, 2016, 7 pages.
International Search Report and Written Opinion for PCT/US2017/016857 dated Jun. 9, 2017, 13 pages.
Examination Report for European Patent App. No. 16169799.0, dated Jul. 24, 2017, 5 pages.
International Search Report and Written Opinion for PCT/US2017/048496 dated Nov. 9, 2017, 10 pages.
Extended European Search Report for European Patent App. No. 10749072.4, dated Feb. 15, 2018, 12 pages.
Extended European Search Report for European Patent App. No. 15811077.5, dated Apr. 12, 2018, 11 pages.
Extended European Search Report for European Patent App. No. 15858793.1, dated Jul. 11, 2018, 10 pages.
Notice of Reasons for Refusal for Japanese Patent App. No. 2016-575179 dated Jan. 10, 2019, 9 pages (with translation).
Extended European Search Report for European Patent App. No. 17750639.1 dated Jan. 16, 2020, 13 pages.

* cited by examiner

FIG. 1A  FIG. 1B
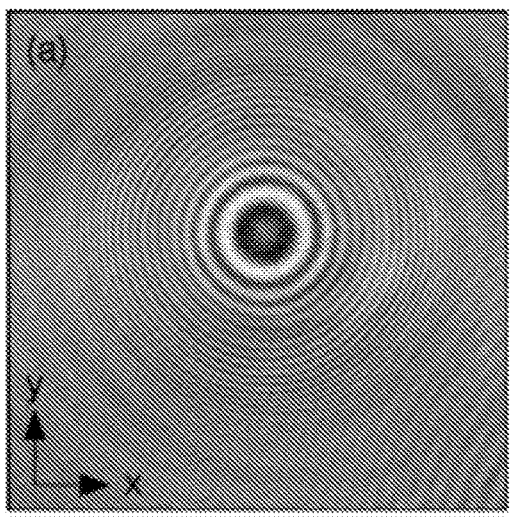 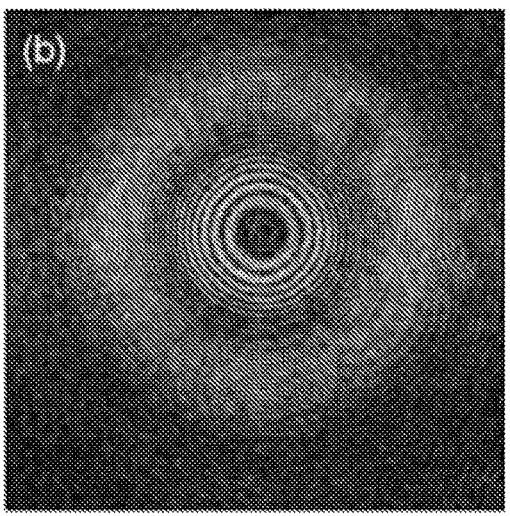
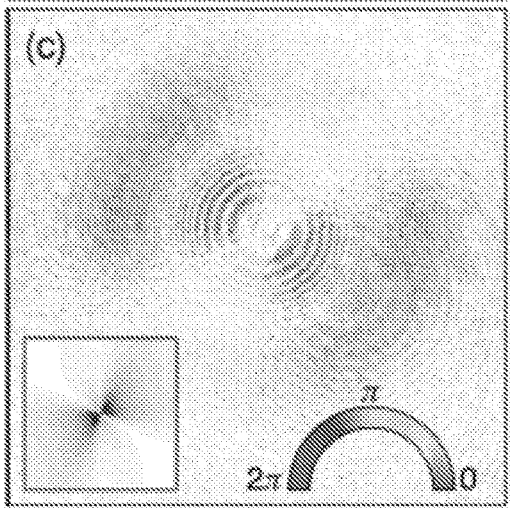 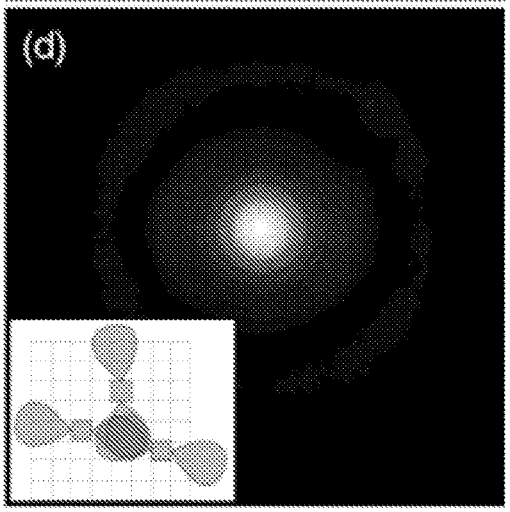
FIG. 1C  FIG. 1D

FAST FEATURE IDENTIFICATION FOR HOLOGRAPHIC TRACKING AND CHARACTERIZATION OF COLLOIDAL PARTICLES

GOVERNMENT INTEREST

The subject invention is subject to rights by the U.S. Government via the MRSEC program of the National Science Foundation under Grant No. DMR-0820341.

FIELD OF THE INVENTION

The invention is directed to a method and system for identification of features by holographic tracking. More particularly the invention is directed to a method and system for time accelerating of features identification by holographic tracking.

BACKGROUND OF THE INVENTION

Holographic microscopy records information about the spatial distribution of illuminated objects through their influence on the phase and intensity distribution of the light they scatter. This information can be retrieved from a hologram, at least approximately, by reconstructing the three-dimensional light field responsible for the recorded intensity distribution. Alternatively, features of interest in a hologram can be interpreted with predictions of the theory of light scattering to obtain exceedingly precise measurements of a scattering object's three-dimensional position, size and refractive index. The availability of so much high-quality information about the properties and motions of individual colloidal particles has proved a boon for applications as varied as product quality assessment, microrheology, porosimetry, microrefractometry, and flow velocimetry, as well as for molecular binding assays, and as a tool for fundamental research in statistical physics and materials science.

However, fitting measured holograms to theoretical predictions requires an initial estimate for each scatterer's position. This can pose challenges for conventional image analysis algorithms because the hologram of a small object consists of alternating bright and dark fringes covering a substantial area in the field of view.

SUMMARY OF THE INVENTION

In order to overcome the disadvantages of the prior art to rapidly and accurately establish positions of the scatterer, such as a center of rotational symmetry, the method and system of the invention take advantage of the concept that intensity gradients in an image either point toward or away from a scatterer's center. Pixel data in a gradient image provides information about where the center of a feature of the scatterer lies in the two-dimensional image plane. A particular selected conventional voting algorithm makes use of that gradient information by allowing each pixel at location r to cast votes for pixels along its preferred direction, $\phi(r)$, the pixel votes being tallied in an accumulator array, with the pixels in the transformed image accumulating the most votes being candidates for scatterer center positions. These positions can then be located with sub-pixel accuracy using standard methods of feature identification or alternatively, each intersection between pixel votes can be completed directly as a set of simultaneous equations. To avoid the inefficiencies of discrete voting algorithms, the method and system of the invention is therefore based on a continuous transform of a scatterer's local field which eliminates the need for threshold selection and further reduces computational burden of localizing circular image features.

In another implementation, machine learning techniques can be used to analyze holograms of objects, such as colloidal spheres, yielding estimates for spheres' positions along the axial, or out-of-plane, direction and also for the individual spheres' characteristics. Holograms of colloidal dispersions encode comprehensive information about individual particles' three-dimensional positions, sizes and optical properties. Extracting that information typically is computationally intensive, and thus slow. Machine-learning techniques, such as neural networks and support vector machines (SVMs), can analyze holographic video microscopy data in real time on low-power computers. The resulting stream of precise particle-resolved tracking and characterization data provides unparalleled insights into the composition and dynamics of colloidal dispersions and enables applications ranging from basic research to process control and quality assurance.

These and other objects advantages and features of the invention, together with the organization and manner of operation thereof, will become apparent when taken in conjunction with the accompanying drawings.

BRIEF DESCRIPTION OF THE DRAWINGS

FIG. 1A illustrates a normalized hologram b(r) of an 0.8 micrometer radius polystyrene sphere in water; FIG. 1B illustrates magnitude $|\nabla b(r)|$ of the gradient of the image of FIG. 1A; FIG. 1C illustrates the orientation, $2\phi(r)$, of the gradients with the inset showing phase angle of the orientation alignment convolution kernel; FIG. 1D illustrates an orientation alignment transform of the image of FIG. 1A with the inset being a schematic representation of how three pixels contribute to the real part of the transform;

DETAILED DESCRIPTION OF PREFERRED EMBODIMENTS

Figure 2:
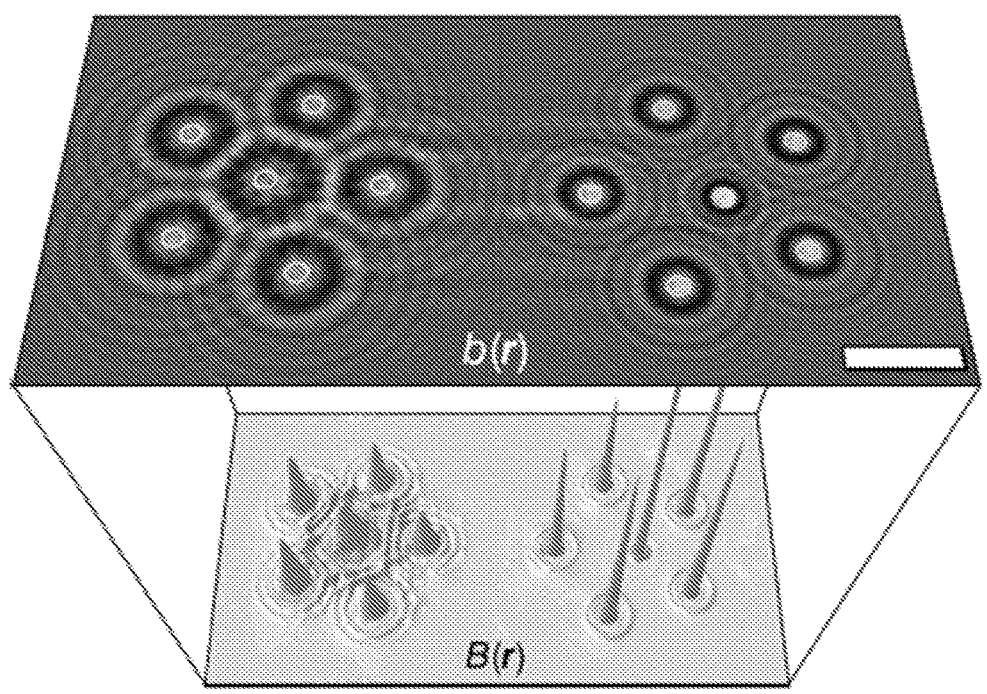
FIG. 2 illustrates feature identification in a multi-particle holograph showing a normalized hologram of 12 colloidal spheres, each being 3 micrometers in diameter processed by the orientation alignment transforms to coalesce concentric ring patterns into peaks with peak centers indicated by circular plotted over the original image (the scale bar indicates 10 micrometers)

Machine learning techniques can be used to analyze holograms of objects, such as colloidal spheres, yielding estimates for spheres' positions and characteristics. This estimates can provide information about the objects that are precise enough for real-world applications, and performing rapidly enough for real-time operation.

One implementation relates to the use of FIG. 1A shows a typical hologram of a colloidal polystyrene sphere in water. This hologram was recorded with an in-line holographic video microscope using a collimated linearly polarized laser for illumination (Coherent Cube, vacuum wavelength $\lambda$=447 nm). Light scattered by the sphere interferes with the rest of the beam in the focal plane of a microscope objective (Nikon Plan Apo, 100× oil immersion, numerical aperture 1.4). The objective, in combination with a tube lens, relays the interference pattern to a video camera such as, (NEC TI-324A II) with an effective magnification of 135 nm/pixel. The intensity distribution recorded by the video camera is normalized by a background image to suppress spurious interference fringes due to imperfections in the illumination and the optical train. FIG. 1A shows a 480×480 pixel region of the normalized intensity, b(r).

The sphere's hologram features concentric bright and dark circular fringes all centered on a point in the focal plane that coincides with the sphere's center. This center could be identified by performing a circular Hough transform, which additionally would identify the radii of all the rings. Hough transforms, however, have a computational complexity of $O\{N^4\}$ in the number N of pixels on the side of each N×N image, and thus are prohibitively costly. Variants of Hough transforms that identify centers but not radii can achieve a computational complexity of $O\{N^3 \log N\}$.

More efficient searches for centers of rotational symmetry take advantage of the observation that gradients in the intensity of images such as FIG. 1A either point toward or away from the centers. FIG. 1B shows the magnitude, $|\nabla b(r)|^2$, of the image's gradient. Each pixel in the gradient image, $\nabla b(r)$, is associated with a direction, $$\phi(r) = \tan^{-1}\left(\frac{\partial_y b(r)}{\partial_x b(r)}\right) \quad (1)$$

relative to the image's $\hat{x}$ axis. FIG. 1C shows $\phi(r)$ for the image in FIG. 1A. Each pixel therefore offers information that the center of a feature might lie somewhere along direction $\phi(r)$ relative to its position r. Voting algorithms make use of this information by allowing each pixel to cast votes for pixels along its preferred direction, the votes of all pixels being tallied in an accumulator array. Hough transforms operate on a similar principle, but also incorporate distance information. Pixels in the transformed image that accumulate the most votes in then are candidates for center positions, and may be located with sub-pixel accuracy using standard methods of particle tracking. Alternatively, each intersection between pixels' votes can be computed directly as the solution of a set of simultaneous equations. Voting algorithms typically identify the centers of features such as the example in FIG. 1A to within 1/10 pixel. Efficient implementations have a computational complexity of $O\{N^3\}$. Achieving this efficiency, however, relies on judiciously distinguishing pixels that might contribute to circles from pixels in the background. An alternative to discrete voting algorithms based on a continuous transform of the local orientation field eliminates the need for threshold selection and further reduces the computational burden of localizing circular features in an image. The spatially varying orientation of gradients in b(r) may be described with the two-fold orientational order parameter $$\psi(r) = |\nabla b(r)|^2 e^{2i\phi(r)}. \quad (2)$$

The factor of 2 in the exponent accounts for the bidirectional nature of orientation information obtained from gradients, as can be seen in FIG. 1C. Weighting the order parameter by $|\nabla b(r)|^2$ ensures that pixels in regions with stronger gradients contribute more to the estimate for the local orientation. To identify symmetry-ordained coincidences in the orientation field, $\phi(r)$ is convolved with the two-fold symmetric transformation kernel, $$K(r) = \frac{1}{r} e^{-2i\theta}, \quad (3)$$

to obtain the orientation alignment transform $$\Psi(r) = \int K(r-r')\psi(r')d^2r'. \quad (4)$$

The phase of K(r) complements the phase of $\psi(r)$, as can be seen in the inset to FIG. 1C. The integrand of Eq. (4) therefore is real-valued and non-negative along the line r'-r that is oriented along $\theta = \phi(r')$, and is complex-valued along other directions. Real-valued contributions directed along gradients of b(r) accumulate at points r in $\Psi(r)$ that are centers of symmetry of the gradient field, as illustrated schematically in the inset to FIG. 1D. Complex-valued contributions, by contrast, tend to cancel out. Centers of symmetry in b(r) therefore are transformed into centers of brightness in $B(r) = |\Psi(r)|^2$, as can be seen in FIG. 1D. The centroid of the peak then can be identified and located. Circular features at larger radius from a center of symmetry subtend more pixels in b(r) and thus would tend to have more influence over the position of the center of brightness in B(r). The factor of 1/r in Eq. (3) ensures that all of the interference fringes comprising the hologram of a sphere contribute with equal weight to estimate for the centroid. The resulting separation of scales accounts for the successful identification and location of twelve colloidal spheres in the hologram reproduced in FIG. 2. Despite interference between the spheres' scattering patterns and uncorrected motion artifacts in the hologram, each sphere's contribution to the hologram is resolved into a single peak by the orientation alignment transform. The orientation alignment transform in Eqs. (3) and (4) is a form of the Fourier-Mellin transform, which is used to detect geometrically invariant features in images. It can be computed efficiently using the Fourier convolution theorem, $$\Psi(k) = K(k)\psi(k) \quad (5)$$

where $\psi(k)$ is the Fourier transform of $\psi(r)$, and where $$K(k)y(k) = K(k)\psi(k) = \frac{1}{k}e^{-2i\theta} \quad (6)$$

is the Fourier transform of $K(r)$. The orientation alignment transform therefore can be calculated by performing a fast Fourier transform (FFT) on $\Psi(r)$, multiplying by a precomputed kernel, $K(k)$, and then performing an inverse FFT. Computing the gradient image by convolution with a Savitzky-Golay filter reduces sensitivity to noise in $b(r)$ and can be performed in $O\{N^2\}$ operations. The transform's overall computational complexity is set by the $O\{N^2 \log N\}$ cost of the forward and inverse FFT, and so is more efficient than voting algorithms. Rather than requiring sequential analysis of above-threshold pixels, moreover, the orientation alignment transform lends itself to implementation on parallel processors. One implementation in the IDL programming language achieves real-time performance (30 frames/s) for identifying and locating multiple particles in images such as FIG. 2.

Applying the same analysis to each snapshot in a holographic video sequence yields a time-resolved trajectory for each sphere in the field of view. FIG. 3A shows the in-plane trajectory of the sphere from FIGS. 1A-1D obtained in this way from 16,500 consecutive video frames. Each frame, moreover, yields two measurements of the particle's position because the even and odd scan lines are recorded separately. Given the recording rate of 29.97 frames/s the time interval between interleaved video fields is $\Delta t = 16.68$ ms. The camera's exposure time, 0.1 ms, is fast enough that the sphere will not have diffused appreciably during image acquisition. The 33,000 position measurements plotted in FIG. 3A record the particle's Brownian motion over more than 9 min.

Assuming that the sphere diffuses freely without significant hydrodynamic coupling to surrounding surfaces, the mean-squared displacement, $$\Delta r_j^2(\tau) = \langle [r_j(t+\tau) - r_j(t)]^2 \rangle \quad (2)$$

should satisfy the Einstein-Smoluchowski equation $$\Delta r_j^2(\tau) = 2D_j\tau + 2\epsilon_j^2 \quad (8)$$

where $r_j(t)$ is the sphere's position along one of the Cartesian coordinates with $r_0(t) = x(t)$ and $r_1(t) = y(t)$, where $D_j$ is the diffusion coefficient along that direction, and where $\epsilon_j$ is the error in the associated position measurement. Analyzing measured trajectories with Eq. (8) therefore provides a method to measure the precision with which a particle's position can be measured.

Figure 3B:
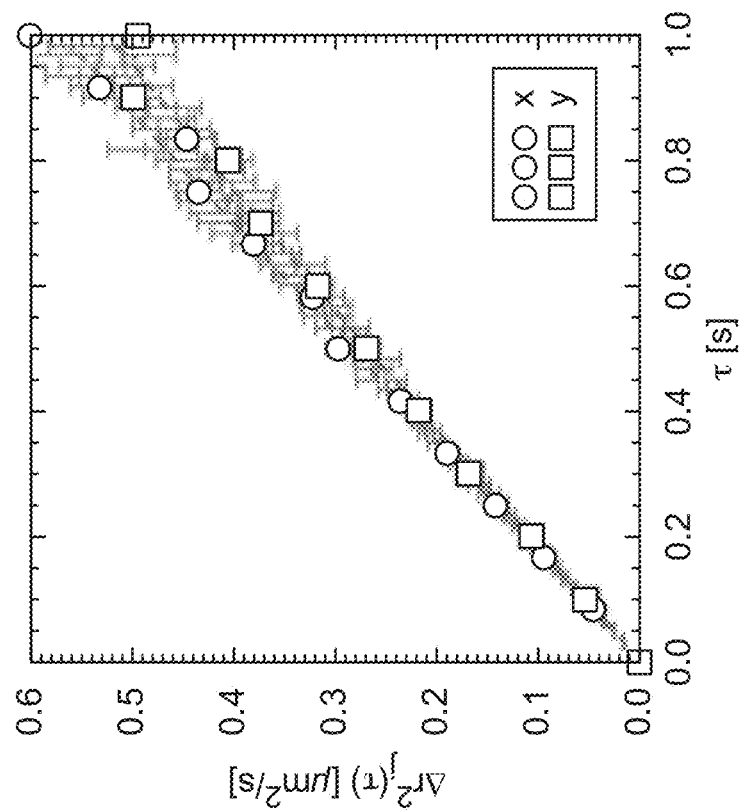
FIG. 3B illustrates the mean-squared displacement along $\hat{x}$ and $\hat{y}$ computed from the trajectory in FIG. 3A together with linear fits to Eqn. 8 hereinafter and plotted as dashed curves.
Figure 3A:
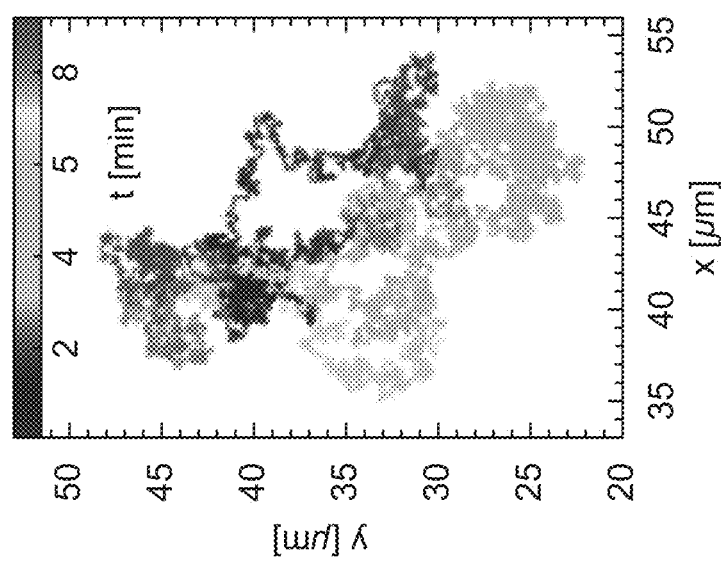
FIG. 3A illustrates a trajectory of a colloidal sphere obtained by analyzing a holographic video with the orientation alignment transform (note the "color coded" trajectory of the colloidal sphere over a time of 9.1 m.

The data in FIG. 3B show the mean-squared displacements along the x and y direction computed from the trajectories in FIG. 3A using Eq. (7). Error bars in FIG. 3B reflect statistical uncertainties in the computed values. Although results along the two directions appear to agree with each other to within these uncertainties, least-squares fits to the Einstein-Smoluchowski prediction in Eq. (8) yield slightly different values for the particle's diffusion coefficient: $D_x = 0.292 \pm 0.002$ μm²/s and $D_y = 0.281 \pm 0.002$ μm²/s. This discrepancy may be attributed to blurring along the y direction that arises when the even and odd scan lines are extracted from each interlaced video frame. The resulting loss of spatial resolution along $\hat{y}$ tends to suppress the apparent diffusivity along that direction. This artifact may be avoided by using a progressive scan camera. The larger of the measured diffusion coefficients is consistent with the Stokes-Einstein prediction $$D = \frac{k_B T}{6\pi \eta a_p} = 0.296 \pm 0.002 \ \mu m^2/s$$

for a sphere of radius $a_p = 0.805 \pm 0.001$ μm diffusing through water with viscosity $\eta = 0.912 \pm 0.005$ mPa s at absolute temperature $T = 297.1 \pm 0.2$ K.

Fits to Eq. (8) also yield estimates for errors in the particle's position of $\epsilon_x = 8$ nm and $\epsilon_y = 9$ nm, or roughly 0.06 pixel in each direction. This performance is comparable to the precision obtained with voting algorithms. Because of its speed advantage, the orientation alignment transform in conjunction with centroid-locating algorithms should be immediately useful for in-plane particle tracking applications. In applications requiring greater precision, three-dimensional tracking, or simultaneous tracking and characterization, the orientation alignment transform can provide a fast and reliable starting point for more detailed analysis. The orientation alignment transform performs well for identifying features composed of large numbers of closely spaced concentric fringes. It does not fare so well with simple disk-like features whose few alignment coincidences occur at comparatively large ranges. Such images are better analyzed with Hough transforms, voting algorithms, or related morphological methods. The orientation alignment transform, by contrast, is better suited to holographic images whose rich gradient structure creates a particular computational burden for conventional methods.

Holograms of colloidal spheres obtained with holographic video microscope can be interpreted with predictions of the Lorenz-Mie theory of light scattering to track each particle in three dimensions, and to measure its size and refractive index. State-of-the-art implementations can locate a sphere and resolve its radius both to within a few nanometers, and can determine its refractive index to within a part per thousand. The cost of this powerful technique is the computational burden of fitting each hologram pixel-by-pixel to theoretical predictions. Here, techniques of machine learning are demonstrated that can reduce the processing time by a factor of a thousand, yielding real-time performance.

Figure 8:
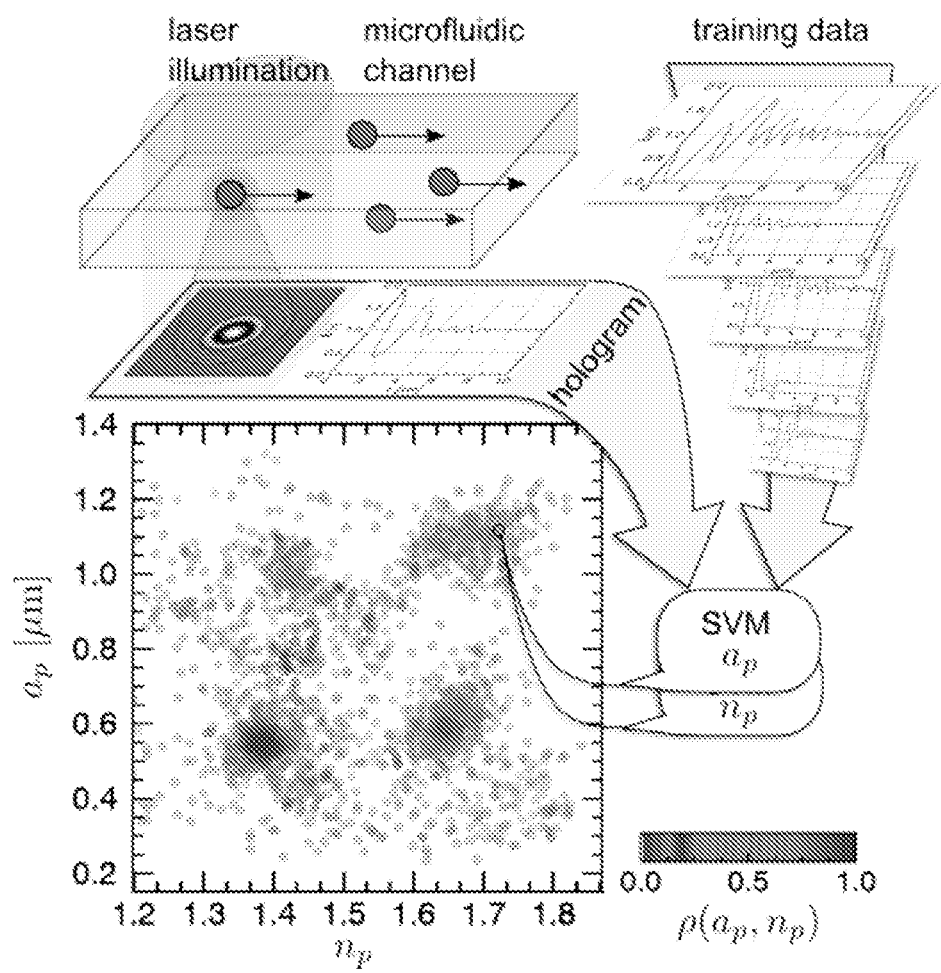
FIG. 8. Colloidal characterization by holographic microscopy and machine learning. Colloidal spheres flowing down a microfluidic sample scatter light from a collimated laser beam to form an in-line hologram. Features in the beam are identified, and their radial profiles presented to support vector machines (SVMs) that compare them with a library of training data to estimate each spheres' radius $a_p$ and refractive index $n_p$. The scatter plot shows results for 2,500 spheres drawn at random from a mixture of four different types of spheres. Each point is colored by the local density of data points, $\rho(a_p, n_p)$.

One implementation to fast holographic characterization, depicted schematically in FIG. 8, employs the support vector machine (SVM) algorithm to compare experimental measurements with pre-computed predictions of the Lorenz-Mie theory. Whereas nonlinear fitting typically requires more than a second on a 1 Gflop computer, a trained SVM can estimate the size, refractive index or axial position of a micrometer-scale sphere in under a millisecond.

The in-line holographic microscope used for these studies illuminates the sample with a linearly polarized collimated laser beam (Coherent Cube, 20 mW) at a vacuum wavelength of $\lambda = 447$ nm. The fluence of the 3 mm-diameter beam is comparable to that of a conventional microscope illuminator. Optical forces and light-induced heating therefore are negligible. Light scattered by a sphere propagates to the focal plane of a custom-built video microscope where it interferes with the undiffracted portion of the original beam. The microscope magnifies this interference pattern onto the detector of a greyscale video camera, which records its intensity with a system magnification of 135 nm/pixel. Each snapshot in the video stream constitutes a hologram of the particles in the channel.

The electric field of the incident beam at position r in the focal plane may be modeled as a plane wave with spatial dependence $E_0(r) = u_0(r)e^{i\phi_0(r)}e^{ikz}\hat{x}$, where $k = 2\pi n_m/\lambda$ is the wavenumber in a medium of refractive index $n_m$, and where $u_0(r)$ and $\phi_0(r)$ account for small variations in the beam's amplitude and phase profiles, respectively.

A particle located at $r_p$ relative to the center of the focal plane scatters the incident illumination, $E_0(r_p)$, to the focal plane as $E_s(r) = E_0(r_p)f_s(k(r-r_p)|a_p, n_p)$, where $f_s(kr|a_p, n_p)$ is the Lorenz-Mie scattering function that describes how a sphere of radius $a_p$ and refractive index $n_p$ scatters an $\hat{x}$-polarized plane wave. The measured intensity then may be modeled as $I_0(r) = |E_0(r) + E_s(r)|^2$. Normalizing the recorded hologram by $I_0(r) = |E_0(r)|^2 = u_0^2(r)$ suppresses spurious structure in the illumination and yields a functional form for the normalized hologram $$b(r) = \frac{I(r)}{I_0(r)} \approx |\hat{x} + e^{ikz_p}f_s(k(r-r_p)|a_p, n_p)|^2, \quad (9)$$

that can be calculated with standard software packages.

A sphere's position (xp, yp) in the plane of a hologram can be identified by first coalescing ring-like features into centers of brightness with standard particle-tracking algorithms. This procedure typically yields xp and yp to within a tenth of a pixel, or better than 20 nm in each coordinate.

Fully interpreting the hologram with Eq. (9) additionally requires estimates for $a_p$, $n_p$ and the axial position, $z_p$. Given reasonable starting values, a typical fit to the normalized hologram of a 1.5 μm-diameter silica sphere in water yields $x_p$ and yp to within 1 nm, $z_p$ to within 3 nm, $a_p$ to within 1 nm, and $n_p$ to within one part per thousand. Unfortunately, general and reliable methods for estimating the unknown parameters have not been available. Previously described approaches based on ad hoc comparisons with Rayleigh scattering or circular diffraction do not yield independent estimates for the refractive index, and often fail to yield $z_p$ and $a_p$ with the accuracy needed for a full nonlinear fit to converge. In such cases, an exhaustive search of the space of initial parameters still can yield good results, but at the expense of time and substantial computational effort. Each fit such a series can require as many as a hundred evaluations of Eq. (9).

In one embodiment, rather than resorting to computationally expensive searches or model-based approximation schemes, instead parameter estimation is treated as a regression problem that is solved with machine learning techniques. Although support vector embodiments are described herein as an exemplary embodiment, it should be appreciated that other regression machine learning schemes may be used, such as decision tree learning, relevance vector machines, artificial neural networks, inductive logic programming, and Bayesian based learning schemes. In one particular embodiment, a neural network approach is used to provide a nonlinear statistical model.

Figure 4:
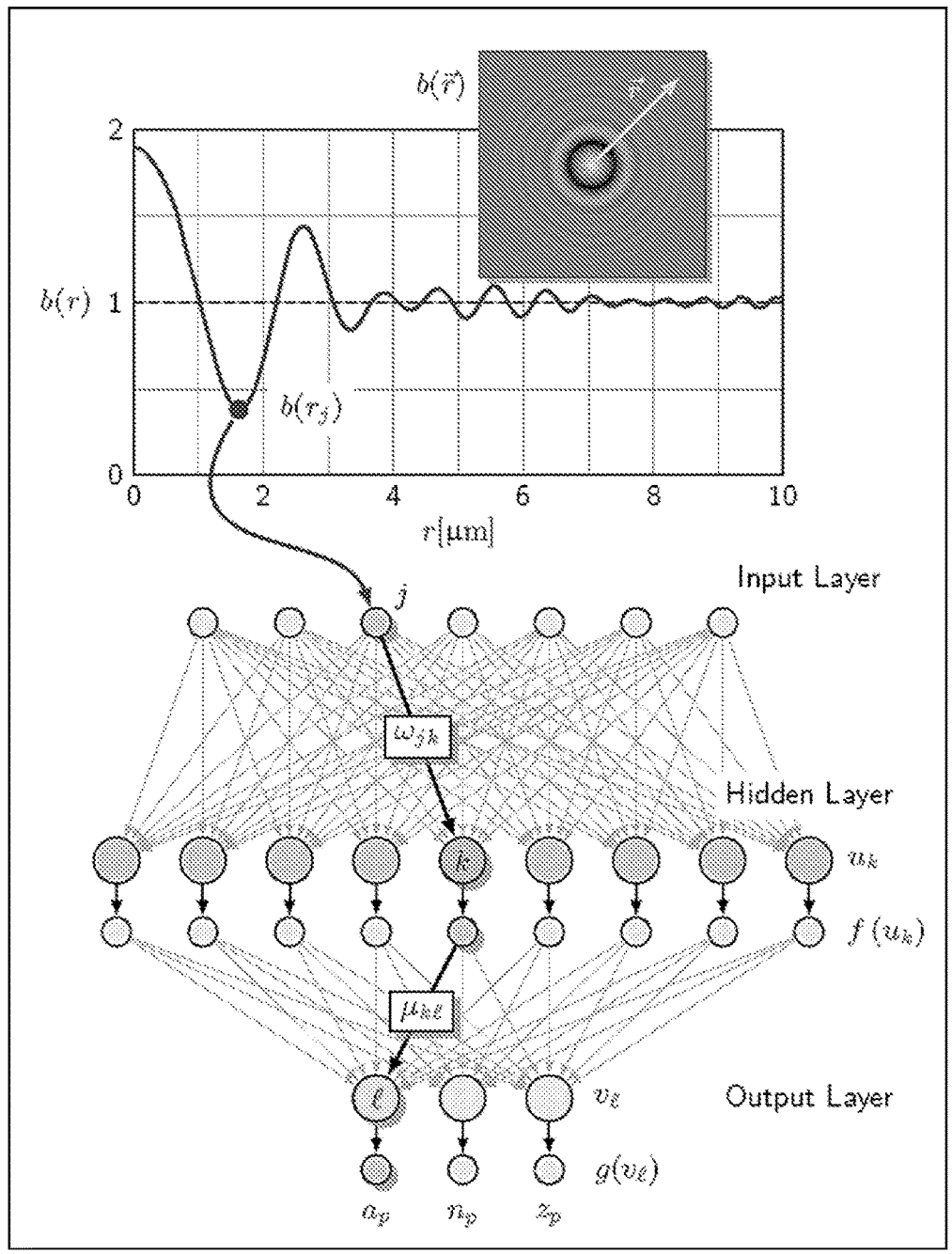
FIG. 4 is a schematic representation of machine-learning analysis of colloidal holograms. A hologram (inset) is averaged over angles to obtain a radial intensity profile b(r). This is fed into the input of a trained machine learning system such as a support vector regression system, which then yields estimates for the particle's radius $a_p$, its refractive index $n_p$ and its axial distance from the focal plane $z_p$.
Figure 5:
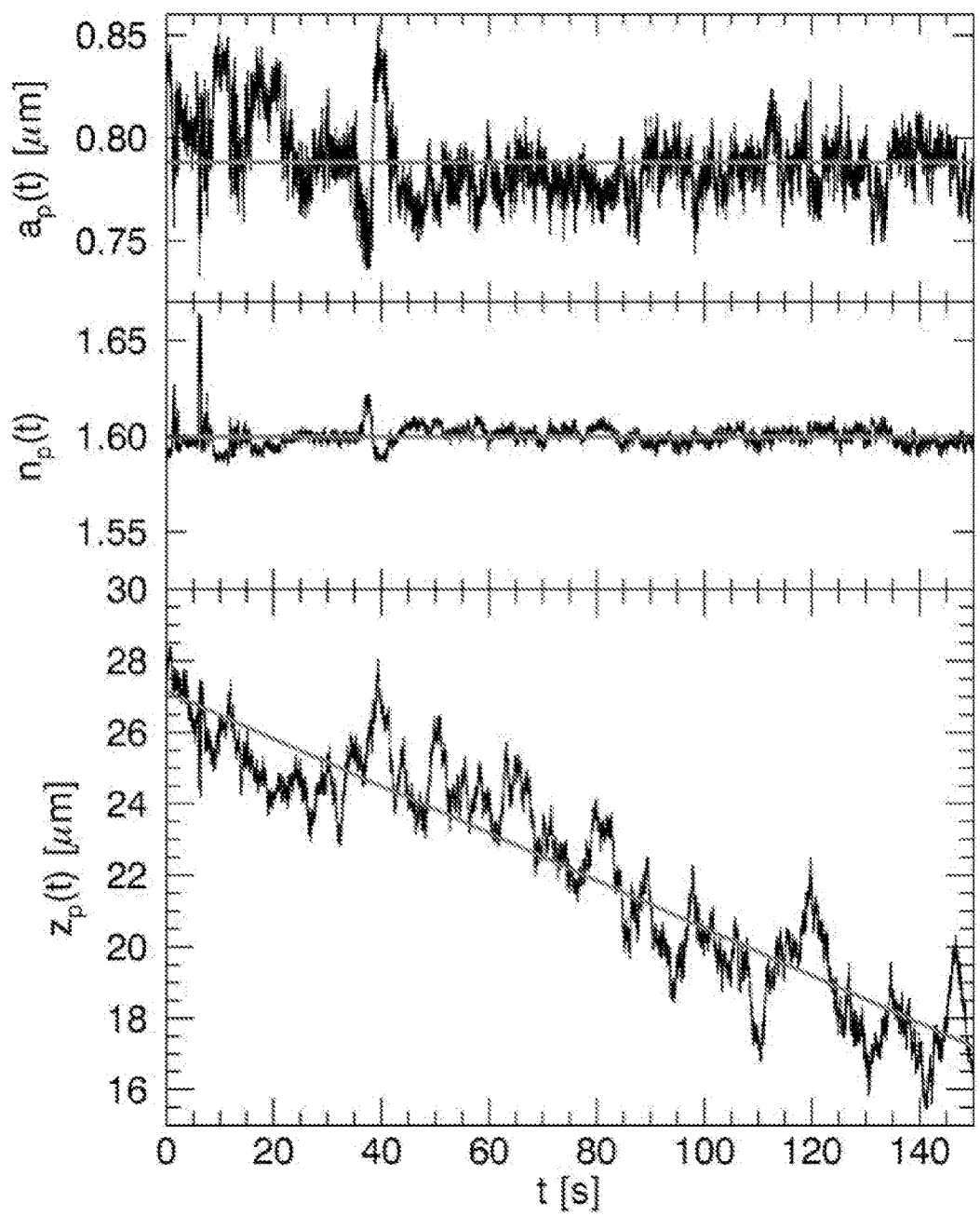
FIG. 5 shows estimated particle radius $a_p$, refractive index, $n_p$ trajectory $z_p(t)$ of a nominally 1.59 μm diameter polystyrene sphere diffusing and sedimenting in water. Superimposed lines show the mean radius, mean refractive index, and linear trend in axial position computed from the data
Figure 6:
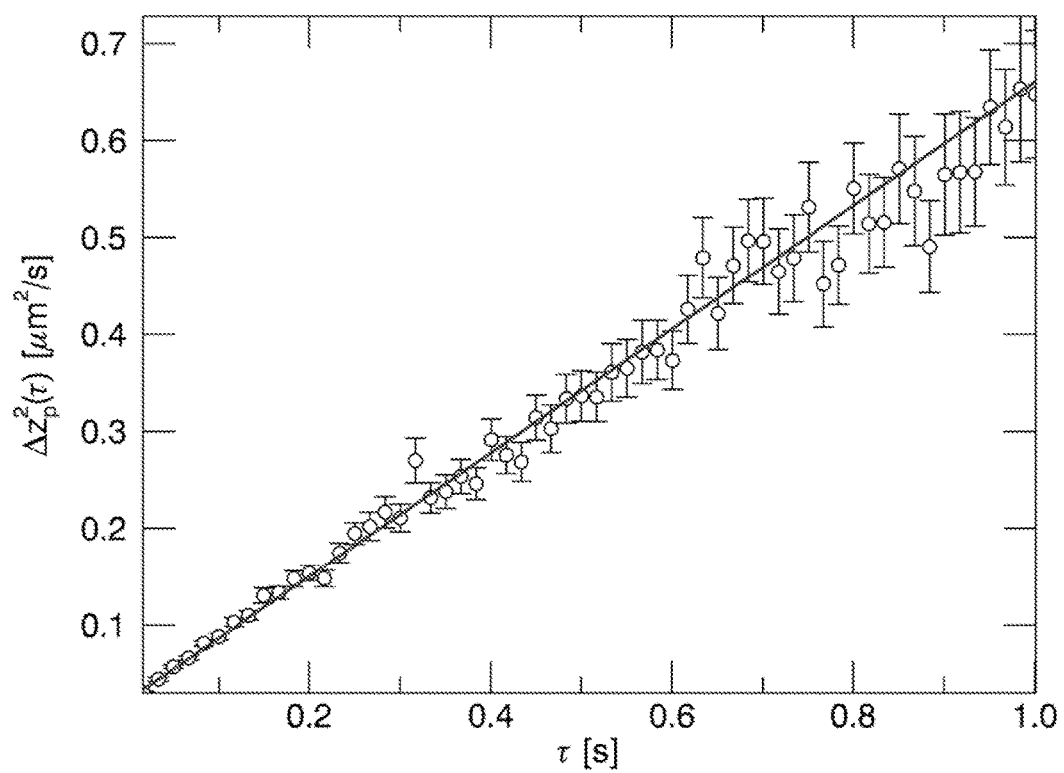
FIG. 6 illustrates mean squared displacement $\Delta z_p(t)$ as a function of lag time τ, together with a fit to Eq. (15).

One example of a support vector embodiment is show as a process indicated schematically in FIG. 4. The radial profile b(r) of a particle's normalized hologram is computed by averaging b(r) over angles around ($x_p$, $y_p$). This trace, consisting of 100 floating point values digitized at 1-pixel intervals, is presented to each of three support vector machines that have been trained to estimate $a_p$ and $n_p$, respectively. A similar approach could be implemented with a neural network using a series of interconnected nodes.

Previous implementations of Lorenz-Mie microscopy fit Eq. (9) to measured holograms using ap, np and rp as adjustable parameters. These fits are exquisitely sensitive to errors in the particle's in-plane position, and so must be performed over the entire two-dimensional intensity distribution. Instead, Eq. (9) is used in one implementation to train support vector machines, which then are able to estimate ap, np and zp from a hologram's one-dimensional radial profile. These profiles are obtained from measured holograms by averaging around centers of rotational symmetry with single-pixel resolution, yielding 100-point data vectors. The associated reduction in dimensionality accounts in part for the implementation's computational efficiency.

The described SVMs are implemented with scikit-learn, an open-source machine learning soft-ware package that builds upon the libsvm library of Support Vector Machine algorithms. Each SVM computes one output parameter from an input vector consisting of a radial profile, b(r), that has been digitized into 100 single-pixel bins. Characterizing and tracking a colloidal particle therefore requires three SVMs, one for each of ap, np and zp. FIG. 8 schematically represents this process for estimating ap and np.

An SVM computes its output by comparing b(r) with sets of training data, bn(r), that are obtained from Eq. (9) over a range of values of ap, np and zp. Each training set constitutes one support vector in the space spanned by these parameters. To facilitate these comparisons, construct SVMs with radial basis functions $k_n(b) = \exp(-\gamma \int |b_n(r) - b(r)|^2 dr)$ that quantify the similarity of the experimental input with the n-th support vector. The sensitivity of this comparison is set by $\gamma$, with larger values favoring more precise results at the cost of requiring more support vectors to span the parameter space. Given a value of $\gamma$, the training process determines a set of weights ωn and an offset s0 such that the weighted sum, sfit(b) = Σn ωnkn(b)+s0, constitutes an estimate for the parameter, s. In general, errors in sfit(b) depend smoothly on $\gamma$. The optimal value for the present application is found to fall in the range $0.1 \leq \gamma \leq 10$.

In addition to the choice of parameters used to construct the support vectors, the SVM's training is governed by two constants that are selected before training begins. The first, typically denoted as C, is a regularization term that determines the relative importance of precision in parameter estimation versus variance in predicted results. For C»1, particular emphasis is placed on correctly predicting the parameters underlying each training set at the cost of assigning large weights to each support vector. Training with large values of C promises precise results, but carries the risk that the SVM might perform erratically when presented with novel data. The second parameter, $\gamma$, sets the scale at which discrepancies between data and support vectors will be tolerated by the radial basis functions. The nth support vector characterized by the training profile $b_n(r)$ is assigned a weight $$w_n(b(r)) = \exp(-\gamma \int |b_n(r) - b(r)|^2 dr), \quad [10]$$

when presented with the experimental profile b(r). Training with a smaller value of $\gamma$ thus allows each training set to cover a wider range of parameters and thus reduces the number of training sets required to cover the intended range of parameters comprehensively.

In one embodiment, to prevent overfitting, the weights ωn are constrained to have magnitudes less than a maximum value that typically is denoted by C. Larger values of C improve an SVM's ability to recognize its training data, but render it less able to smoothly interpolate between its support vectors when presented with novel or noisy inputs.

Some candidate support vectors may be assigned small weighting factors in optimizing sfit(b) over a corpus of training data; these are automatically eliminated from the SVM. Values of $\gamma$ and C thus determine which support vectors are included in the SVM, and their relative importance for computing the output. Because this process is nonlinear, optimal values of $\gamma$ and C are obtained by exhaustive search. Statistically indistinguishable results are obtained in the present application for values of $\gamma$ and C that vary from their optimal values by ten percent. SVMs were trained with a 5,000-member training set whose parameters were evenly distributed over a volume in the three-dimensional space spanned by 13.5 $\mu m \leq zp \leq 75$ $\mu m$, 0.4 $\mu m \leq ap \leq 1.75$ $\mu m$, and $1.4 \leq np \leq 1.8$ at a resolution of 1.35 $\mu m$ in zp, 0.1 $\mu m$ in ap and 0.1 in np. Values for C and $\gamma$ ranging from $10^{-3}$ to $10^5$ were selected for testing. Training time increases dramatically with the number of training sets, and with the values of C and $\gamma$. Once trained, however, each SVM can estimate its parameter extremely rapidly, for example, in under a millisecond.

The quality of a trained SVM can be assessed by presenting it with novel cross-validation data. Optimal values for C and $\gamma$ minimize differences between estimated parameters and the inputs. Using a 500-member cross-validation set, best performance was obtained for estimating zp with C=100 and $\gamma$=1, best performance for np with C=10 and $\gamma$=0.5, and best performance for ap with C=10 and $\gamma$=0.6.

Sampling the entire parameter space accessible to holographic characterization with resolution comparable to the precision realized with nonlinear fits would require more than $10^{10}$ training sets. If, however, the system of interest is characterized by a more modest range of parameters, then results from an initial SVM analysis can be used to generate a comparatively small set of training data spanning the relevant range. This specialized training proceeds rapidly and yields substantial improvements in precision.

The data plotted in FIG. 1 are SVM estimates for the radii and refractive indexes of 2,500 colloidal spheres flowing down a microfluidic channel formed by bonding the edges of a glass microscope cover slip to the surface of a glass microscope slide. The peak flow speed of 1 mm/s transports a sphere across the field of view in no fewer than two video frames, ensuring that every particle in the flow has a chance to be analyzed. Anisotropic blurring due to a sphere's 100 nm motion during the camera's 0.1 ms exposure time suppresses contrast along the direction of motion, but does not appreciably influence the azimuthal average, b(r). Spurious results arising when multiple spheres' interference patterns overlap contribute outliers to the observed distribution of particle sizes and refractive indexes. Such artifacts are minimized by diluting the sample until no more than three particles are present in any frame.

The sample was prepared by dispersing roughly equal proportions of four types of colloidal spheres in water: 1 $\mu m$-diameter and 2 $\mu m$-diameter spheres made of polystyrene and silica. This four-component mixture was flowed through the observation volume during a 12 min interval, and analyzed particle-by-particle. Each data point in FIG. 1 corresponds to an individual sphere, and is colored by the local density of measurements.

SVM-mediated holographic characterization clearly identifies the four populations of particles without any a priori assumptions, and provides estimates for their relative abundances. Characterizing multicomponent dispersions is a unique capability of holographic particle analysis, and can be performed with SVMs as fast as particles' holograms can be acquired.

Neither the instrument nor the analytical technique requires extensive calibration. The wavelength of the laser and the effective magnification can be calibrated once and used for all samples. The refractive index of the medium is the only free parameter, and often can be obtained separately. These parameters are used to train the SVMs in advance, after which they can be used to analyze arbitrary samples dispersed in the medium.

Experiments

Tracking a single colloidal sphere as it sediments and diffuses provides insights into the precision and accuracy of SVM-mediated holographic characterization. The data in FIG. 2 were obtained with a 1.59 $\mu m$-diameter polystyrene sphere (Duke Scientific, catalog 4016A) diffusing as it sedimented through deionized water near the midplane of a 120 $\mu m$-deep channel. FIG. 2(a) shows the time-resolved trajectory, zp(t), obtained from a sequence of 4,500 video frames recorded at 29.97 frames/s using iterative SVM training.

Because polystyrene is roughly 5 percent more dense than water, the sphere sediments more than 10 $\mu m$ over the course of the experiment. The insets to FIG. 2(a) show how markedly the hologram's appearance changes from the beginning of the trajectory to the end. Despite these changes, the SVMs' estimates for the radius and refractive index plotted in FIG. 2(b) remain clustered around the mean values ap=0.79±0.02 $\mu m$ and np=1.600±0.006.

Uncertainties in estimated parameters are computed as standard deviations of the distribution of results plotted in FIG. 2(b). These should be interpreted with care because errors in SVM estimates need not be independent or normally distributed. Data points in FIG. 2(b) cluster around different values as the particle descends, which suggests that different support vectors dominate the estimates for ap and np when the sphere is at different axial positions. Systematic errors in the individual parameters therefore may vary with changes in any of the parameters' values. Even so, the averages of the SVM estimates are consistent with the manufacturer's specifications, and differ only slightly from those obtained with a full Lorenz-Mie analysis of the same data set, which yields ap=0.805±0.001 $\mu m$ and np=1.5730±0.0006. Nonlinear fitting offers ten times better precision and accuracy. SVM analysis is a thousand times faster.

The mean sedimentation speed, vp=66±1 nm/s, estimated from the slope of zp(t) is some-what smaller than the value measured with fits to the Lorenz-Mie theory of 75±1 nm/s. This discrepancy further suggests that the SVM estimate for a parameter's value may depend on the value itself. As described above with regard to Equations 7 and 8, if it is assumed that errors in zp are normally distributed with a root-mean-square value $\epsilon_z$, then the diffusing particle's mean-squared displacement should evolve over time interval $\tau$ as $$\Delta z_p^2(\tau) = \langle [z_p(t+\tau)-z_p(t)]^2 \rangle_t = 2D\tau + v_p^2\tau^2 + 2\epsilon_z^2, \quad (11)$$

where D=kBT/(6$\pi\eta$ap) is the Stokes-Einstein value for the particle's diffusion coefficient. The data in FIG. 2(c) yield D=0.319±0.004 $\mu m^2/s$, which is slightly larger than the value of 0.292±0.004 $\mu m^2/s$ obtained with the full Lorenz-Mie analysis. The best-fit tracking error, $\epsilon_z$=107±2 nm, exceeds the Lorenz-Mie bound by an order of magnitude.

The results presented here are typical of the performance of SVMs for characterizing and tracking colloidal spheres. The speed and precision of SVM characterization is ideal for monitoring, feedback control and quality assurance in any industrial process involving colloidal spheres. Being able to resolve multimodal distributions by quickly amassing single-particle measurements avoids ambiguities inherent in population-averaging methods such as dynamic light scattering. Extracting the refractive index as well as the size offers insights into sample composition that otherwise would not be available. SVM-accelerated tracking can be used for real-time three-dimensional particle-image velocimetry. For applications such as microrefractometry, the medium's refractive index, $n_m$, can be estimated instead of the particle's.

This combination of capabilities enables new applications. For example, the distribution of properties in colloidal mixtures could serve as fingerprints for complex fluid systems, with the sizes, refractive indexes and relative abundances encoding information that can be accessed with SVM-mediated holographic characterization. Thus, in one implementation colloidal fingerprinting includes adding a mixture of colloidal particles to a product, where the different types of particles differ in their radii and refractive indexes. Those properties are selected from distinct and distinguishable classes. As an example, the four-part mixture of large and small spheres made of silica and polystyrene described above. The presence or absence of different classes of spheres (e.g. large silica) can be used to embed information in the product. That information can be read out using the described holographic characterization techniques, including fast analysis with machine learning techniques (e.g. SVRs). Encoded information might include the date on which the product was created, the manufacturing location, the processing history, and so on. The colloidal "fingerprint" can be added to the product at the time of manufacturing without changing the other desirable properties of the product. This fingerprint then can be read-out at a later time by our method. No other single method would be able to distinguish all the properties of the dispersed particles at once, and thus no other method would be able to "read" the fingerprint. In one particular implementation, the fingerprinting could be used as an anti-counterfeiting measure. Further, the colloidal mixtures could be selected to have properties that vary over time such as due to breakdown of a compound to further provide a key for the fingerprint or act as another variable in the fingerprint.

Such applications can be realized with comparatively simple instruments conveying image data to low-power computers. Although training SVMs can be computationally intensive, the data comprising a set of trained SVMs occupies less than 100 Mbyte. Pre-computed SVMs therefore can be archived and rapidly retrieved when needed. This approach lends itself to implementation on embedded computers for integration into low-cost analytical instruments.

Other machine-learning techniques also might be effective for analyzing holograms of colloidal particles. Artificial neural networks, for instance, can be trained in the same manner as the present SVM implementation to interpret radial profiles of experimental holograms. SVMs have the advantage that their training process proceeds deterministically, and therefore tends to be faster. Once successfully trained, however, artificial neural networks are generally more computationally efficient. Regardless of implementation, the present results demonstrate that machine-learning methods facilitate fast and precise measurements of colloidal properties.

Figure 7:
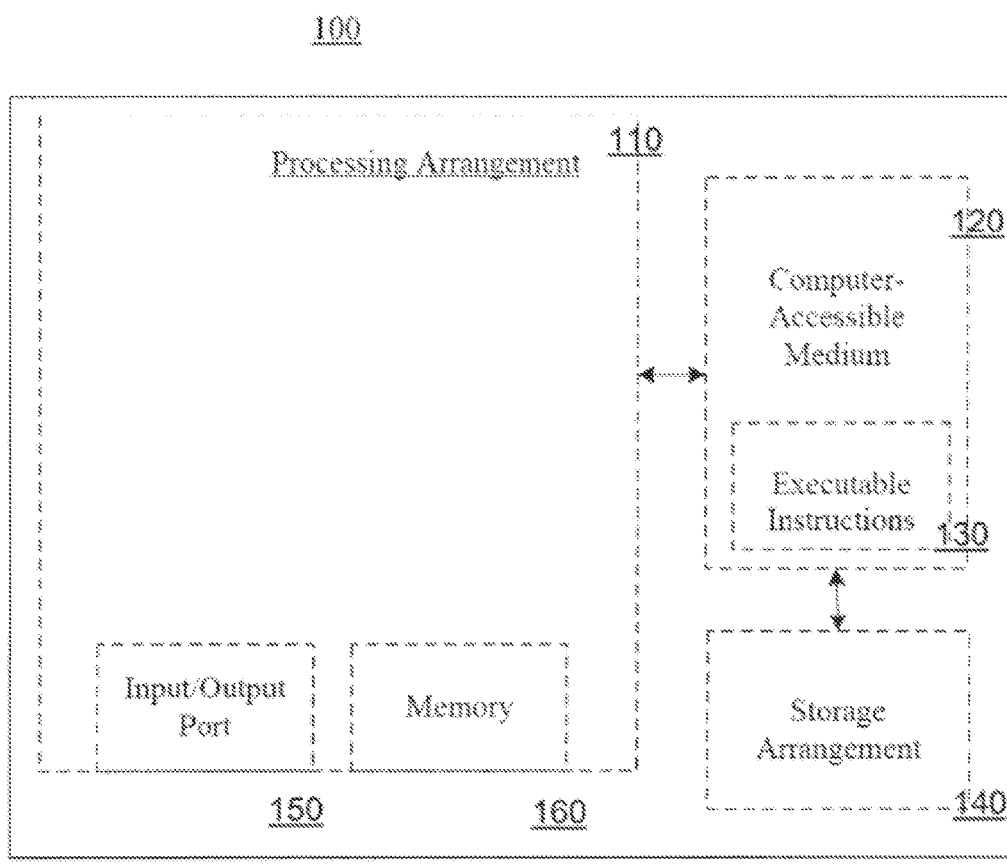
FIG. 7 illustrates a computer implemented system and method of one embodiment.

FIG. 7 shows an exemplary block diagram of a system 100 for both this first embodiment and for a second embodiment described hereinafter. For example, an exemplary procedure in accordance with these embodiments can be performed by a processing arrangement 110 and/or a computing arrangement 110. Such processing/computing arrangement 110 can be, e.g., entirely or a part of, or include, but not limited to, a computer/processor that can include, e.g., one or more microprocessors, and use instructions stored on a computer-accessible medium (e.g., RAM, ROM, hard drive, or other storage device).

As shown in FIG. 7, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example. The system 100 includes a computer with a non-transitory computer-accessible medium containing executable instructions therein to analyze features of an object, wherein when at least one hardware computing arrangement 110 executes the instructions, the hardware computing arrangement 110 performs a method comprising the steps thereof, receiving hologram data of the object; containing information on direction of intensity gradients for the hologram data and analyzing the hologram data to determine the direction of the intensity gradients, thereby enabling the identification of features of the object.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The invention claimed is:

1. A method of feature identification in holographic tracking and identification for features of a spherical object, comprising the steps of:
inputting a collimated laser beam;
scattering the collimated laser beam from the object to generate a scattered beam;
recording a hologram characteristic of the interference between the scattering beam and the input beam;
determining, using an orientational alignment transform, from the recorded hologram an estimate of a two-dimensional position of the spherical object; and
determining, using the two-dimensional position of the spherical object and a machine learning algorithm an estimate of an axial position of the object and a size of the spherical object and a refractive index of the spherical object.

2. The method of claim 1, wherein determining, using the orientational alignment transform, from the recorded hologram an estimate of a two-dimensional position of the spherical object further comprises:
establishing intensity gradients for pixels in the hologram;
determining direction for the intensity gradients for each of the pixels; and
analyzing the direction of the intensity gradients to identify centers of rotational symmetry.

3. The method of claim 2, further comprising transforming each of the center of rotational symmetry into a centers of brightness.

4. The method of claim 2, wherein determining the object's position in a plane of the hologram comprises coalescing ring-like features into centers of brightness with a circular Hough transform and then locating the centers of brightness.

5. The method of claim 1, wherein further comprising:
applying Lorenz-Mie solution to the recorded scattering; and
determining the estimate of the axial position as well as object size and refractive index from the application of the Lorenz-Mie solution to the recorded scattering.

6. The method of claim 5, wherein the determination of the axial position, object size and refractive index is obtained with a machine learning algorithm, and wherein determining the estimate comprises comparing the hologram to a set of learned models in the machine learning algorithm.

7. The method in claim 6, wherein the machine learning algorithm consists of a support vector machine.

8. The method of claim 7, wherein the machine learning device is a neural network and determining the estimate comprises comparing the hologram to a set of learned models in the neural network.

9. A method of feature identification in holographic tracking and identification for features of an object, comprising the steps of:
inputting a collimated laser beam;
scattering the collimated laser beam from the object to generate a scattered beam;
recording a hologram characteristic of the scattering beam;
establishing intensity gradients with an orientational alignment transform for a plurality of pixels in the hologram;
determining direction for the intensity gradients for each of the pixels; and
analyzing the direction of the intensity gradients to identify features of the object.

10. The method as defined in claim 9 wherein the direction of the intensity gradients is associated with a direction analysis, $$\phi(r) = \tan^{-1}\left(\frac{\partial_y b(r)}{\partial_x b(r)}\right)$$

where r is a radial distance from a center of the object's hologram, b(r) is a gradient image, $\hat{x}$ is one image axis and $\hat{y}$ is another image axis perpendicular to $\hat{x}$.

11. The method as defined in claim 10 wherein the direction of the intensity gradients derived from $\phi(r)$ is determined by applying the step of performing a voting analysis.

12. The method as defined in claim 11 wherein the voting analysis comprises the step of establishing votes for each of the pixels along a preferred direction with votes tallied.

13. The method as defined in claim 12 wherein the votes tallied are evaluated to determine most votes, thereby establishing candidates for a center position of the object.

14. The method as defined in claim 12 wherein the votes tallied for each of the pixels are calculated directly as a solution of a set of simultaneous equations.

15. The method as defined in claim 12 further including the step of identifying the pixels having background intensity contributions, thereby removing those pixels from the voting analysis.

16. The method as defined in claim 11 wherein the $\phi(r)$ is determined by the step of applying a continuous transform of local orientation field.

17. The method as defined in claim 16 wherein the continuous transform of the local orientation field includes determining a gradient image using a two-fold orientation order parameter, $$\Psi(r) = |\nabla b(r)|^2 e^{2i\phi(r)},$$

wherein the factor of 2 multiplying $\phi(r)$ accounts for the bidirectionality of orientation information obtained from the intensity gradients.

* * * * *